United States Patent Office 2,895,102
Patented July 14, 1959

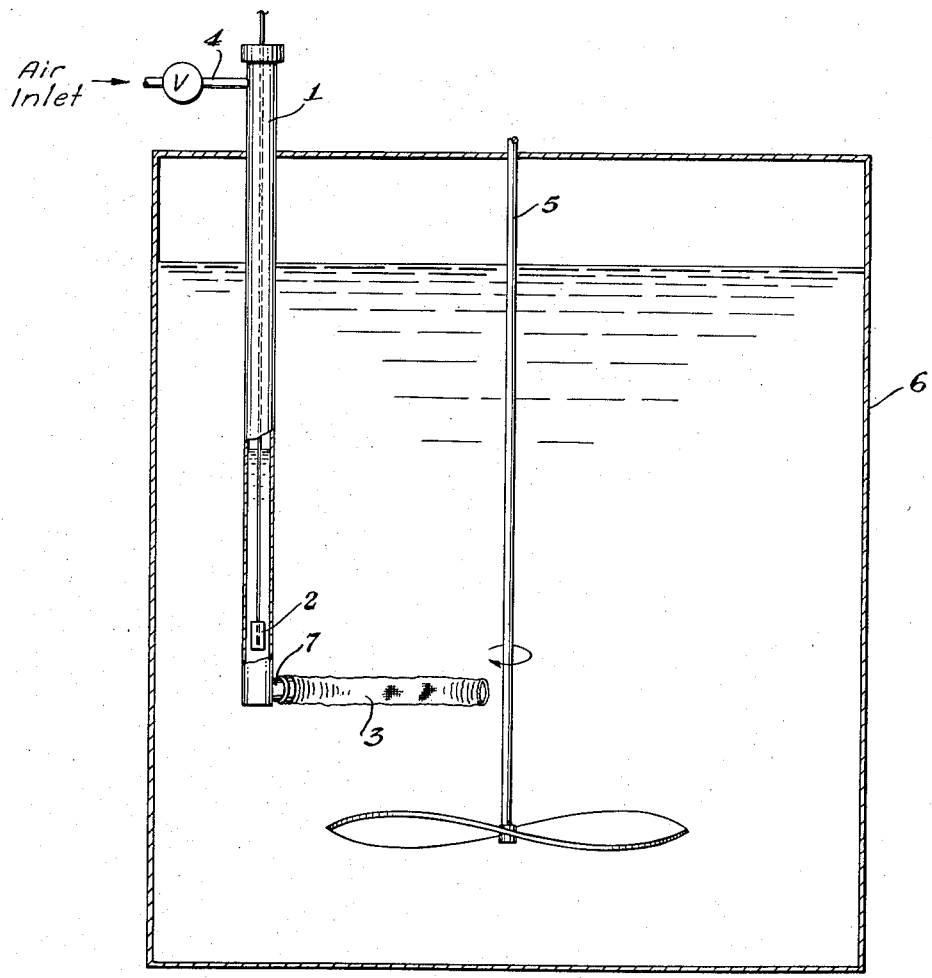

2,895,102

DETERMINATION OF CONDUCTIVITY OF LIQUIDS

Porter Hart, Lake Jackson, and Hugh C. Behrens, Angleton, Tex., assignors to The Dow Chemical Company, Midland, Mich., a corporation of Delaware Application April 5, 1957, Serial No. 650,883

3 Claims. (Cl. 324—30)

This invention relates to determinations of conductivity of liquids, and more particularly to an improved method and an improved apparatus for determining the electrical conductivity of a mother liquor in an aqueous slurry.

In many processes it is often necessary to change reaction conditions as a reaction proceeds or to be able to determine the extent of conversion or reaction that has taken place in a reactor in a given time. In these processes it is desirable to be able to determine continuously the conversions obtained as the reaction proceeds. Often this determination may be made by basing it upon some physical property of the reaction mixture which varies with the conversion. In aqueous salt solutions electrical conductivity of the solution is one of these physical properties that may be uesd. Where solutions are encountered, a conductivity cell can be immersed in the reaction product and the conductivity determined continuously. In many operations such as carbonation of sodium bicarbonate to form sodium carbonate, an agitated slurry is present. Attempts to use a conductivity cell in the slurry will result in erroneous readings. The solid particles interfere with the analysis and the cell becomes caked with the solids. Heretofore in determining the conductivity of the mother liquor in the slurry, samples were periodically withdrawn from the carbonation tanks, filtered, and the conductivity of the filtrate determined. This is very time consuming, since a large number of samples have to be taken whenever the reaction approaches the conversion at which it is desirable to stop it or to change the conditions.

It is, therefore, a principal object of this invention to provide an improved apparatus and process for continuously determining the electrical conductivity of the mother liquor of an aqueous slurry. A further object is to provide an improved filter which will not become clogged and can be used in agitated reactors. Other objects will become apparent when the specification is read in conjunction with the attached drawing which shows diagrammatically an improved apparatus as used in an agitated aqueous slurry.

The above and additional objects may be accomplished by placing a conductivity cell in a chamber having an inlet to which is attached an open end tubular sleeve filter made of knit synthetic hydrophobic polymer type fibers. The chamber is immersed in the slurry with the inlet in line with the direction of the flow of the slurry due to agitation. Periodically the pressure within the chamber is increased and decreased to expel the old mother liquor from the chamber and to draw fresh mother liquor into contact with the conductivity cell. By using an open end tubular sleeve filter made of a fine synthetic hydrophobic polymer type fiber the mother liquor can be drawn into the chamber without having any of the solids entering. This sleeve filter will not become caked or clogged with the solids as experienced in filters made of other materials.

An improved apparatus comprising a chamber 1, a conductivity cell 2, and the tubular sleeve filter 3 is shown diagrammatically in the attached drawing. In the operation, the slurry stirred by agitator 5 will impart a circular flow to the slurry within reactor 6. The chamber 1 is lowered into the slurry with its inlet 7 in line with the flow of the slurry and facing downstream. The tubular sleeve filter attached to inlet 7 being light weight is fully extended by the flow with the open end downstream from the chamber. To continuously obtain a fresh mother liquor in contact with the conductivity cell, air is pulsed into chamber 1 through pipe 4. Pulsation cycles 1 minute or shorter may be used so that fairly continuous determination of the electrical conductivity of the mother liquor is obtained.

The critical part of the apparatus is the open end tubular sleeve filter. This surprisingly allows only the mother liquor to contact the conductivity cell. The filtering action obtained is such that it does not become plugged or need cleaning. Thus, the apparatus can be continuously used without the necessity of frequent withdrawals from the slurry to clean the filter. The filter is made of nylon and the like superpolyamides or other synthethic hydrophobic fiber-forming polymer such as various polyesters, including esters of ethylene glycol and terephthalic acid; acrylonitrile polymers, including polyacrylonitriles; and the like. It is a fine knit or woven material having a construction so as to provide an interstitial area of from ½ to twice of a conventional 60 mesh 15 denier knit nylon hosiery material in relaxed condition. A 60 mesh 15 denier nylon sleeve is preferred. In many operations a 60 mesh 15 denier or a 55 mesh 20 denier woman's nylon stocking with a foot part of the stocking removed at the ankle may be used. The length of the sleeve used is at least equal to the diameter of the sleeve. Generally, the length employed is from 2 to 5 times its diameter. Longer filters can be used with the length being limited only by the inconvenience of having an extra long filter.

This improved apparatus and method may be used in determining electrical conductivity of the mother liquor of aqueous slurry solutions, such as encountered in carbonation of sodium bicarbonate to sodium carbonate, carbonation of a calcium chloride and magnesium hydroxide slurry to obtain a calcium carbonate and magnesium chloride slurry, and other reactions of aqueous slurries.

While larger units may be used, the size of the apparatus generally employed in large commercial reactors is such that the volume of the mother liquor drawn into and expelled from the chamber is in the range of 100 to 200 cubic inches per cycle. With the apparatus of this size, the inlet to the chamber usually consists of a ½ inch to a 2 inch size pipe and the filter sleeve is around 2 to 4 inches in diameter and around 18 inches long. In smaller type units the size of the individual parts would be proportionally smaller.

It is apparent that while in the drawing a dip-pipe type of an apparatus is shown, any type of a chamber having an inlet through which the mother liquor is drawn into and discharged may be used. Also, means other than pulsating air may be used to effect the flow of mother liquor into and out of the chamber.

The following example further illustrates the invention but is not to be construed as limiting it thereto.

Example

In a 20 foot diameter carbonation tank, a conductivity device as shown by the drawing was installed. The chamber consisted of a 2 inch pipe and the inlet 7 was made of a 1 inch pipe. A conventional nylon woman's stocking of 60 mesh and 15 denier with the foot part removed at the ankle was attached to this 1 inch inlet and used as the sleeve filter. The conductivity cell was placed inside of the pipe near the inlet. A continuous recorder was used with the conductivity cell so that the electrical conductivity of the mother liquor could be continuously recorded. The dip-pipe was fitted at the top with an air inlet. Air was forced into the dip-pipe at sufficient pressure to lower the liquid level by 2 feet and then the pressure was released. This was done at 1 minute cycles. With this pulsation the sample in contact with the conductivity cell was continually changed. In the operation, the nylon filter extended out at right angles to the dip-pipe with the open end pointing in the direction of flow of the reactor contents. This conductivity device with the nylon sleeve was operated continuously for two months in the commercial reactor and gave excellent results. For some reason it acted as an effective filter allowing only liquid to reach the conductivity cell and remained free from caked crystals. The slurry in the reactor was composed of sodium chloride, sodium carbonate, and sodium bicarbonate in water. It contained from 8 to 10 weight percent of solids with the crystals of sodium bicarbonate being mainly of around 150 mesh size and the sodium carbonate crystals mainly 100 mesh.

The use of a filter other than nylon or other synthetic hydrophobic fiber-forming polymer material was ineffective as a filter for the conductivity cell. When a filter of approximately the same size and material as described above is used but the material is made of cotton, the filter soon becomes caked with the crystals and is ineffective.

What is claimed is:

1. In an apparatus for continuously determining the electrical conductivity of the mother liquor in an agitated aqueous slurry comprising a chamber submerged in said slurry, said chamber having an inlet through which fluid is drawn in said chamber and expelled therefrom, and a conductivtiy cell placed in said chamber in contact with the fluid drawn therein, the improvement which comprises a flexible tubular sleeve open at both ends one of said ends being attached to said inlet and the other being free to move with the movement of the agitated slurry, said sleeve being made of synthetic hydrophobic polymer type fiber having a construction providing an interstitial area of from ½ to twice of a 60 mesh 15 denier knit nylon material in relaxed condition and having a length at least equal to its diameter.

2. An apparatus according to claim 1 wherein the tubular sleeve is a 60 mesh 15 denier in relaxed condition of knit nylon having a length of from 2 to 5 times its diameter.

3. An apparatus according to claim 1 wherein the tubular sleeve is a 60 mesh 15 denier woman's hosiery with the foot part removed at the ankle.

References Cited in the file of this patent

UNITED STATES PATENTS

| | | |
|---|---|---|
| 2,071,697 | Larrabee | Feb. 23, 1937 |
| 2,083,074 | Maass | June 8, 1937 |
| 2,549,363 | Blickman | Apr. 17, 1951 |